United States Patent Office 3,285,892
Patented Nov. 15, 1966

3,285,892
POLYMERIZATION OF VINYL HETEROCYCLIC COMPOUNDS
James C. MacKenzie, Wellesley Hills, and Adam Orzechowski, Waltham, Mass., assignors to Cabot Corporation, Boston, Mass., a corporation of Delaware
No Drawing. Filed Mar. 4, 1963, Ser. No. 262,365
The portion of the term of the patent subsequent to January 18, 1982, has been disclaimed
18 Claims. (Cl. 260—85.7)

This invention relates to the polymerization and copolymerization of vinyl heterocyclic compounds such as vinyl carbazole and vinyl pyrrolidone.

Accordingly, it is a principal object of the present invention to provide a novel process for polymerizing vinyl heterocyclic monomers and mixtures thereof.

It is a further object of the present invention to provide a novel process for copolymerizing vinyl heterocyclic monomers with other monomeric species.

Other objects of the present invention will in part be obvious and will in part appear hereinafter.

In accordance with the present invention, vinyl heterocyclic monomers are polymerized and/or copolymerized with similar and other monomeric species by catalysts comprising (a) the product of the reaction carried out under certain conditions between a halide-type compound of a metal of Group IVa, Va or VIa and a finely-divided particulate inorganic solid having surface hydroxyl groups thereon, and (b) an organometallic compound. The polymerization or copolymerization reaction can be effected at suitable temperatures within the range of from about $-80°$ C. to about $190°$ C., and pressures ranging from below atmospheric upwardly to any desired maximum pressure.

Inorganic solids suitable for the purposes of the present invention generally include any inorganic compound which is available in finely-divided particulate form with hydroxyl groups on the surface thereof. For example, oxides such as alumina, zirconia, and silica, carbon blacks such as channel black and furnace black, and aluminates such as corundum are all generally suitable for the purposes of the present invention. Solids having an average particle size of less than about 0.1 micron are, however, definitely preferred.

Halide-type compounds of Group IVa, Va and VIa (hereinafter generally referred to as transition metal halides) suitable for the purposes of the present invention are the compounds conforming to the general empirical formula:

$$TO_aX_b$$

wherein T is a metal of Groups IVa, Va or VIa (where the group numbers correspond to the Mendeleev Periodic System); O is oxygen; $a$ is a number from 0 to 2; each X is any halogen; and $b$ is a number from 1 to 6.

Examples of suitable compounds conforming to said general formula are halides such as zirconium tetrachloride, vanadium tetrachloride, and titanium tetraiodide, and oxyhalides such as chromium oxychloride and vanadium oxychloride.

The conditions under which reaction between the transition metal halide and the finely-divided inorganic solid can be accomplished are subject to considerable variation. However, in order to obtain a catalyst component with exceptionally high activity and reproducible character and performance, it has been found to be all important that the finely-divided inorganic solid be essentially dry and anhydrous (i.e. free of molecular water in any form) at the time it is brought into contact with the transition metal halide. In addition, it is recommended that the reaction of the inorganic solid and the transition metal halide be accomplished so as to allow gaseous by-products of the reaction to be eliminated from the reaction zone in order to thereby insure that said reaction goes to completion. Generally, the said reaction can be carried out by contacting said inorganic solid with said transition metal halide, preferably in a solution thereof in an inert hydrocarbon medium, and maintaining the two reactants in intimate contact for a period of time sufficient to effect the desired chemical reaction resulting in the chemical bonding of the transition metal to the inorganic solid. The length of time required to effect a given amount of such reaction and chemical bonding is largely dependent upon the temperature of the reaction mixture and the rate of removal of the gaseous by-products. Generally speaking, almost any temperature between about $0°$ C. and $300°$ C. and even higher temperatures can be used satisfactorily, but room temperature to about $105°$ C. is generally preferred. Assuming provision is made for intimate contact of the dry inorganic solid and the transition metal halide, the *minimum* time required to accomplish the chemical reaction will vary from periods of the order of about 10 hours at room temperature to periods of the order of about 1 minute at temperatures of $100°$ C. or over. Temperatures substantially higher than about $300°$ C., e.g. $500°$ C., are completely needless and therefore of little or no interest.

Elimination of by-products of the reaction from the reaction zone, i.e. from the reaction medium, can be accomplished in any convenient manner such as, by sweeping the reaction vessel with an inert gas, by carrying out the reaction at sufficiently elevated temperatures while stirring to drive off by-products, and by complexing or reacting said by-products with suitable substances such as tertiary amines, tertiary arsines, tertiary phosphines, terpenes, terpinenes, tetrasubstituted hydrazines, carbides such as calcium carbide, and other substances which will react or complex with said by-products and thereby eliminate them.

Organometallic compounds suitable for the purposes of the present invention are the compounds chosen from the group consisting of (a) Compounds conforming to the empirical formula $$MM'_vX_nR_y$$

wherein M is a metal chosen from Groups I, II and III of the periodic table; M' is a metal of Group I of the periodic table; $v$ is a number from 0 to 1; each X is any halogen; $n$ is a number from 0 to 3; each R is any monovalent hydrocarbon radical or hydrogen; $y$ is a number from 1 to 4; and (b) Compounds conforming to the empirical formula $$R'_pH_mSO_{\frac{4-(m+p)}{2}}$$

wherein each R' is chosen from the group consisting of monovalent hydrocarbon radicals, monovalent alkoxy radicals, monovalent aryloxy radicals, and the halogens; $p$ is a number from 0 to 3; each H is a hydride radical; $m$ is a number from 1 to 4; S is chosen from the group consisting of quadrivalent silicon, germanium, tin and lead; and O is oxygen.

Specific examples of R' groups for substitution in the above formula include methyl; 2-methyl-2-butenyl; n-dodecyl; 4-cyclohexylethyl; methylnaphthylethyl; 2,2,1-bicycloheptyl; tolyl; xylyl; xenyl; methoxy; isobutoxy; n-octyloxy; phenoxy and 1,2-naphthoxy.

Specific examples of compounds conforming to the formula $$R'_pH_mSO_{\frac{4-(m+p)}{2}}$$

which are suitable for the purposes of the present invention are silane—$SiH_4$;
ethylsilane—$H_3SiC_2H_5$;
diethylmonochlorosilane—$HSiCl(C_2H_5)_2$;
dichlorosilane—$H_2SiCl_2$;
methyldiethylsilane—$HSi(C_2H_5)_2CH_3$;
trimethoxysilane—$HSi(OCH_3)_3$;
tribenzylsilane—$HSi(CH_2C_6H_5)_3$;
dicyclohexylphenylsilane—$HSiC_6H_5(C_6H_{11})_2$;
triphenoxysilane—$HSi(OC_6H_5)_3$;
triphenylgermane—$(C_6H_5)_3GeH$;
tricyclohexylgermane—$(C_6H_{11})_3GeH$;
tribenzylgermane—$(C_6H_5CH_2)_3GeH$;
ethylisoamylgermane—$(C_2H_5)(C_5H_{11})GeH_2$;
dibutylstannane—$(C_4H_9)_2SnH_2$;
diisopropylstannane—$(C_3H_7)_2SnH_2$;
tripentylstannane—$(C_5H_{11})_3SnH$;
n-butylgermane—$C_4H_9GeH_3$;
triphenylplumbane—$(C_6H_5)_3PbH$;
triethoxystannane—$(C_2H_5O)_3SnH$ and the like;

cyclic alkyl hydrogen silicones such as $(CH_3HSiO)_6$; and linear alkyl hydrogen silicones such as $$(CH_3)_2HSiOSiH(CH_3)_2$$

Organometallic compounds which conform to the formula $$MM'_vX_nR_y$$

and which are suitable for the practice of the invention include compounds conforming to the subgeneric formula $$M(R)_k$$

wherein M is a Group I, II or III metal, such as sodium, beryllium, boron, aluminum and gallium; wherein $k$ is a number from 1 to 3 depending upon the valency of M; and wherein each R may be hydrogen or any monovalent hydrocarbon radical. Examples of suitable hydrocarbon radicals include aryl or alkaryl radicals, aliphatic hydrocarbon radicals, or derivatives, such as alkyl, cycloalkenylalkyl, arylalkyl, alkylcycloalkyl and cycloalkylalkenyl.

Specific examples of R groups for substitution in the above formula include methyl, isobutyl, hexyl, n-dodecyl, 2-methyl-2-butenyl, 4-bicycloheptyl, dimethylcyclohexyl, 5-cyclopentadienyl, phenylcyclohexyl, tolyl, xylyl, xenyl, and dimethylnaphthyl.

Specific compounds conforming to the empirical formula $$MM'_vX_nR_y$$

and which are therefore suitable for the purposes of the present invention are organo compounds such as butyllithium, di-p-tolylmercury, tri-n-amylboron, triisobutylaluminum, diisobutylaluminum bromide, phenylmercuric iodide, hexylcupric chloride, octylmagnesium hydride, triethyllithium aluminum bromide and sodiumdiphenyllithium. Definitely preferred, however, are the aluminum alkyls such as aluminum triisobutyl.

Further specific examples of suitable organometallic compounds conforming to the formula $$MM'_vX_nR_y$$

can be found in our copending U.S. application, Serial No. 2,861, filed January 18, 1960, now abandoned.

It is pointed out that catalysts formed with certain organometallic compounds such as the silanes require activation by heating, in the case of the silanes to temperatures above about 100° C. and preferably above about 130° C. for at least about 1 hour. At higher temperatures, shorter periods of time are required. At substantially lower temperatures, the catalyst is either not formed at all or is of inferior quality.

Although it is appreciated that when R or R′ in the above empirical formulae do not comprise at least one hydrocarbon radical, the resulting compounds cannot normally be termed organometallic compounds, compounds lacking at least one hydrocarbon radical comprise such a relatively small number of compounds included by said general formulae that for the purposes of the present invention, it is intended that these compounds be included within the generic term, organometallic compound. Accordingly, in the specification and in the claims, it is intended, and therefore, it should be understood, that the term, organometallic compound, refers to all the compounds included within the scope of the above defined general formulae.

In addition, it is pointed out that while, strictly speaking, silicon and germanium are not metals, it is intended, and therefore it should be understood, that for the purposes of the present specification and claims, silicon and germanium are metals and the term organometallic includes within its scope, silicon and germanium compounds within the scope of the formula below.

Vinyl heterocyclic monomers suitable for the purposes of the present invention are those compounds which conform to the formula $$H_2C=CHZ$$

wherein each H is hydrogen; C is carbon; Z is chosen from the group consisting of substituted and unsubstituted heterocyclic ring compounds wherein at least one atom of said ring is chosen from the group of elements consisting of nitrogen, oxygen and sulphur, and wherein the total number of carbon atoms in said ring structure is at least two and less than about 18. Specific examples of suitable vinyl heterocyclic monomers are N-vinyl carbazole; 1-vinyl-2-pyrrolidone; 2-vinyl phenoxathiin; 2-vinyl dibenzofuran; 2-vinyl quinoline; 5-ethyl-2-vinyl pyridine; 3-vinyl pyridine; 1-methyl-3-vinyl piperidine; 5-bromo-3-vinyl pyridine; and the like.

Monomers suitable for copolymerization with said vinyl heterocyclic monomers include:

(a) Vinyl esters conforming to the formula:

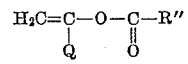

wherein H is hydrogen; Q is chosen from the group consisting of hydrogen, any hydrocarbon radical having 1 to 3 carbon atoms and any substituted hydrocarbon group having 1 to 3 carbon atoms; and R″ is chosen from the group consisting of hydrocarbon radicals and halogen-substituted hydrocarbon radicals having 1–18 carbon atoms. Specific examples of vinyl esters within the scope of the present disclosure are vinyl chloroacetate; vinyl propionate; vinyl butyrate; vinyl benzoate; vinyl acetate; vinyl formate; vinyl 2-ethyl butyrate; vinyl crotonate; vinyl dichlorobenzoate and 1-methyl-vinyl butyrate;

(b) α-Mono- and di-olefins such as ethylene; propylene; 1,3-butadiene; pentene-1; 1,3-hexadiene; 1,5-hexadiene and the like; and (c) Halogen-substituted α-mono- and di-olefinic hydrocarbons conforming to the formula:

$$CH_cX_d=C'H_eX_f$$

wherein each H is hydrogen; $c$ is a number from 0 to 2; each X is any halogen; $d$ is a number from 1 to 2; $c+d=2$; C′ is any aliphatic, alicyclic or aromatic carbon chain which contains 1–18 carbon atoms; $e$ is a number from 0 to 36; $f$ is a number from 1 to 6; and wherein $f+d$ equals at least one. Specific halogen-substituted α-mono- and di-olefinic hydrocarbons included are 1,2-difluoroethylene; 1,3-dichloropropene; 3,3-dibromo-1-fluoropropene; 1,6-dichloro-1,5-hexadiene; 2-fluoro-1,3-butadiene; vinyl chloride; tetrafluoroethylene; 2-methyl-1-chloropropene; 1,6-difluoro-8-iodo-1-pentadecene and 1-vinyl-4-chloronaphthalene;

(d) Acrylic monomers conforming to the formula:

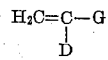

wherein D is chosen from the group consisting of hydrogen, any halogen, methyl, ethyl and propyl radicals; and G is a functional group chosen from the group consisting of carbalkoxy (—COOR) wherein the hydrocarbon radical has a length of one to eighteen carbon atoms; carbamoyl (—CONH$_2$); N-substituted carbamoyl

wherein the hydrocarbon radicals have a length of one to eighteen carbon atoms; formyl (—CHO); cyano (—CN); and acyl (—COR) wherein the hydrocarbon radical has a length of one to eighteen carbon atoms. Specific examples of suitable acrylic monomers are N-methyl acrylamide; isopropyl acrylate; methyl methacrylate; acrylonitrile; acrolein; ethylacrylate; methyl vinyl ketone and α-chlorovinyl methyl ketone;

(e) Vinyl ethers conforming to the formula:

wherein E is chosen from a group consisting of hydrogen, any halogen, and any hydrocarbon radical having a length of one to eighteen carbon atoms; and F is chosen from the group consisting of any hydrocarbon radical and halogen-substituted hydrocarbon radical having a length of one to eighteen carbon atoms. Specific vinyl ethers within the scope of the present disclosure are vinyl methyl ether; vinyl isobutyl ether; vinyl n-butyl ether; vinyl 2-chloroethyl ether; divinyl ether and vinyl ethyl ether; and (f) Formaldehyde: It should be noted that the compounds paraformaldehyde and trioxane are low polymers of formaldehyde, trioxane being a cyclic trimer and paraformaldehyde a low linear polymer of from 2 to about 100 monomeric units. Generally, the first step in the polymerization of these materials is a depolymerization procedure, the actual polymerization reaction being of the pure monomer, formaldehyde. Hence, it is intended that the term, "formaldehyde," as utilized herein include both trioxane and paraformaldehyde.

Using the catalysts of this invention, polymerization and copolymerization of the vinyl heterocyclic monomers can often be accomplished in the absence of liquids (other than the monomers themselves) solvents or diluents, for example, in the gas phase, but it is usually more convenient to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as n-hexane, 2,3-dimethylbutane, n-dodecane, dimethylcyclopentane, methyldecalins, and the like are suitable. Also, members of the aromatic hydrocarbon series, such as isopropyl benzene, ethyltoluene, hemimellitene, pseudocumene, isodurene, isoamylbenzene, and particularly the mono-nuclear aromatic hydrocarbons such as xylenes, mesitylene and xylene-p-cymene mixtures, and the like are completely suitable.

The proportion of surface reacted particulate inorganic solid to organometallic compound utilized in preparing the catalyst is not usually a critical feature of the process. We have found from experience that a molar ratio of from about 0.1 to 5 millimoles of the organometallic compound per atom of transition metal chemically combined to the surface of the finely-divided solid is to be preferred.

The quantity of catalyst, i.e., comprising both the surface reacted finely-divided solid and the organometallic compound, to be utilized in the polymerization reaction may vary, but in general, the total quantity of catalyst that need be employed based on the weight of the charging stock is very small particularly when a very fine particle size oxide is utilized as the inorganic solid.

The contact time or space velocity employed in the polymerization process will be selected with reference to the other process variables such as the particular catalysts utilized, the specific type of product desired, and the extent of monomer conversion desired in any given run or pass over the catalyst. In general, this variable is readily adjustable to obtain the desired results.

There follow a number of illustrative nonlimiting examples:

*Example 1*

To a 2000 milliliter, three neck, glass reaction vessel equipped with a stirrer, condenser and nitrogen inlet and outlet tubes, there is added 15 grams of "Cab-O-Sil," a pyrogenic silica produced by Cabot Corporation, which has an average particle diameter of about 10 millimicrons and a hydroxyl group content on the surface thereof of about 1.5 milliequivalents per gram. To said reaction vessel there is added 1700 milliliters of toluene and the resulting slurry is dried by being heated to, and maintained at, the boiling point of toluene, about 111° C., for about 24 hours while a water/toluene azeotrope is removed from the reaction vessel by periodic distillation until 500 milliliters of distillate has been removed. The vessel is then cooled and charged with 15 millimoles of titanium tetrachloride. The resulting slurry is then heated to, and maintained at, about 80° C. for about 8 hours, while the contents of the vessel are continuously stirred and swept with a stream of dry nitrogen. Subsequently, the extent of the reaction between the titanium tetrachloride and the hydroxyl groups on the silica is determined by measuring the quantity of HCl that was produced and by testing the liquid contents of the vessel for the absence therein of titanium tetrachloride, and the said silica is found to have 15 milliatoms of titanium chemically bound to the surface thereof. An aliquot of the slurry containing about 1 milliatom of titanium bound to about 1 gram of silica and about 80 milliliters of toluene is then transferred from this reaction vessel to a 1000 milliliter, three neck, reaction flask previously flushed with dry nitrogen and equipped with a heating mantle and stirrer. Next, 1 millimole of triisobutyl aluminum is added to said vessel followed by 40 grams N-vinyl pyrrolidone previously dissolved in 500 milliliters anhydrous toluene. Said vessel is then heated to, and maintained at, about 80° C. while being continuously agitated for about 24 hours. The reaction products are analyzed and it is found that 10 grams of solid vinyl pyrrolidone polymer has been produced.

*Example 2*

To a 2000 milliliter stainless steel stirred autoclave previously flushed with dry nitrogen, there is added 160 milliliters of the chlorotitanated silica slurry produced in Example 1 containing about 2 millimoles of titanium chemically bound to the surface of about 2 grams of silica. Next, there is introduced into said autoclave 5 millimoles of triethylsilane and 500 milliliters anhydrous toluene. The autoclave is then heated to, and maintained at, about 150° C. with continuous agitation, for about 2 hours. After cooling to about 80° C. at which temperature the autoclave is thereafter maintained, there is added to said autoclave about 22 grams of N-vinyl pyrrolidone dissolved in 500 milliliters of anhydrous toluene and 17 grams of vinyl acetate. Next, the autoclave is pressurized to 500 p.s.i.g. with dry nitrogen and the contents thereof are continuously agitated for about 4 hours. The reaction products are analyzed and it is found that a vinyl pyrrolidone-vinyl acetate copolymer has been produced.

*Example 3*

To a 2500 milliliter, three neck, glass reaction vessel equipped with a stirrer, condenser and nitrogen inlet and outlet tubes, there is added 25 grams of "P–25," a pyrogenic titania produced by Deutsche Gold- und Silber-Scheideanstalt Vormals Roessler and which has an average particle diameter of about 20 millimicrons and a hydroxyl group content on the surface thereof of between about 1 and 1.4 milliequivalents per gram. Next, there is added to said vessel 2000 milliliters of isooctane and the resulting slurry is azeotropically dried in accordance with the procedure set forth in Example 1 until about 750 milliliters of distillate have been removed. Said vessel is then cooled and charged with 15 millimoles of vanadium oxytrichloride. Said vessel is then continuously stirred, and heated to, and maintained at, a temperature of about 100° C. for a period of about 10 hours while the contents thereof are swept by a stream of dry nitrogen. Subsequently, the extent of reaction between the vanadium oxytrichloride and the titania is determined by measuring the quantity of HCl removed from the vessel by the nitrogen stream, and by testing the liquid contents of the vessel for the absence therein of vanadium oxytrichloride and the said titania is found to have 15 milliatoms of vanadium chemically bound to the surface thereof. 100 milliliters of this slurry containing about 1.2 milliatoms of vanadium bound to the surface of about 2 grams of titania is then transferred from this reaction vessel to a 1000 milliliter, three neck, glass reaction flask which has been previously flushed with dry nitrogen. Next, about 500 milliliters anhydrous isooctane and 2 millimoles triisobutyl aluminum are charged to said vessel followed by 500 millimoles of 2-vinyl pyridine. The resulting mixture is then agitated at ambient temperatures for about 24 hours. The reaction products are analyzed and it is found that solid vinyl pyridine polymer has been produced. When under the same conditions, the triisobutyl aluminum is utilized alone as the catalyst, i.e. in the absence of the cocatalyst, a polyvinyl pyridine polymer is produced but the molecular weight of the polymer is much lower than the polymer produced in the presence of a catalyst comprising both components.

*Example 4*

To a one-gallon stainless steel autoclave there is charged 200 milliliters of the vanadated titania slurry produced in Example 3 which contains about 2.4 milliatoms of vanadium chemically bound to about 4 grams of titania. Next, there is added 2000 milliliters of anhydrous isooctane, 3 millimoles of butyllithium, 200 millimoles of acrylonitrile and 200 millimoles of 2-methyl-5-vinyl pyridine. Said vessel is then heated to, and maintained at, about 80° C. with continuous agitation for 2 hours. The reaction products are analyzed and it is found that an acrylonitrile-2-methyl-5-vinyl pyridine copolymer has been produced.

*Example 5*

To a 1000 milliliter, three neck, glass reaction vessel there is added 10 grams of "Alon," a pyrogenic alumina produced by Deutsche Gold- und Siber-Scheideanstalt Vormals Roessler, and which has an average particle diameter of about 10–40 millimicrons and a hydroxyl group content on the surface thereof of about 0.7 milliequivalent per gram. Said reaction vessel is then placed in a vacuum drying oven heated to a temperature of about 110° C. for about 15 hours. Subsequently, the vessel is sealed without exposing said alumina to the atmosphere and there is charged to said vessel 5 millimoles of titanium tetrafluoride in 500 milliliters of anhydrous n-heptane. The vessel is then continuously stirred and maintained at refluxing temperatures for a period of about 10 hours while the contents are swept with a stream of dry nitrogen. Subsequently, the extent of the reaction between the titanium tetrafluoride and the alumina is determined by measuring the quantity of HF removed from the vessel by the nitrogen stream, and by testing the liquid contents of the vessel for the absence therein of titanium tetrafluoride, and the said alumina is found to have 5 milliatoms of titanium chemically combined on the surface thereof. 100 milliliters of this slurry containing about 1 milliatom of titanium bound to the surface of about 2 grams of alumina is transferred from this reaction vessel to a 500 milliliter reaction vessel which has been previously flushed with dry nitrogen. Next, 1 millimole of triisobutyl-aluminum is added to said vessel followed by 200 millimoles of N-vinyl carbazole monomer. Said second vessel is then continuously agitated at ambient temperatures for about 48 hours. The reaction products are analyzed and it is found that solid vinyl carbazole polymer has been produced.

The polymers and copolymers produced by the process of this invention can be subjected to such aftertreatment as may be desired to fit them for particular uses or to impart desired properties. Thus, said polymers and copolymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated therein.

Obviously, many changes may be made in the above-described examples and procedure without departing from the scope of the invention. For example, although only transition metal chlorides and fluorides are mentioned in the above examples, transition metal iodides and bromides are also suitable for the purposes of the present invention. For example, titanium tetrabromide is entirely suitable.

Also, pyrogenically coformed, or coprecipitated metal oxides, or metal oxides coformed with, or mixed with, other compounds are suitable finely-divided inorganic solids for the purposes of the present invention.

Accordingly, it is intended that the above disclosure be regarded as illustrative and in no way limiting the scope of the invention.

What we claim is:

1. A process for polymerizing and copolymerizing vinyl heterocyclic monomers conforming to the formula $$H_2C=CHZ$$

wherein each H is hydrogen; C is carbon; Z is chosen from the group consisting of unsubstituted and alkyl- or halo-substituted heterocyclic ring compounds wherein at least one atom of said ring is chosen from the group consisting of nitrogen, oxygen and sulfur and wherein the total number of carbon atoms in said ring structure is at least two and less than about eighteen, which comprises contacting said monomers at temperatures between about −80° C. and about 190° C. with a catalyst comprising a finely-divided inorganic solid having an average particle diameter of less than about 0.1 micron and carrying in chemical combination on the surface thereof structures conforming to the forumla:

$$TO_aX_b$$

wherein T is a metal of Groups IV*a*, V*a* or VI*a*; O is oxygen; *a* is a number from 0 to 2; each X is an halogen; *b* is a number from 1 to 5; and where said structures are chemically linked directly from T to at least one oxygen atom in the surface of said solid, and an organometallic compound conforming to the general formula (1) $$MM'_vX_nR_y$$

wherein M is a metal of Groups I, II or III; M' is a metal of Group I; *v* is a number from 0 to 1; each X is any halogen; *n* is a number from 0 to 3; each R is any monovalent hydrocarbon radical or hydrogen; and $y$ is a number from 1 to 4, or (2) $$R'_p H_m S O_{\frac{4-(m+p)}{2}}$$

wherein each $R'$ is a hydrocarbon radical, alkoxy radical, aryloxy radical or a halogen; $p$ is number from 0 to 3; each H is a hydride radical; $m$ is a number from 1 to 4; S is quadrivalent tin, lead, germanium or silicon; and O is oxygen.

2. The process of claim 1 wherein each X in the formula
$$TO_a X_b$$
is chlorine.

3. The process of claim 1 wherein each X in the formula
$$TO_a X_b$$
is fluorine.

4. The process of claim 1 wherein in the formula
$$TO_a X_b$$
T is a metal of Group IV$a$.

5. The process of claim 1 wherein in the formula
$$TO_a X_b$$
T is titanium, $a$ is 0, each X is chlorine, and $b$ is 3.

6. The process of claim 1 wherein in the formula
$$TO_a X_b$$
T is a metal of Group V$a$.

7. The process of claim 1 wherein in the formula
$$TO_a X_b$$
T is vanadium.

8. The process of claim 1 wherein the formula
$$TO_a X_b$$
T is a metal of Group VI$a$.

9. The process of claim 1 wherein vinyl pyrrolidone is polymerized.

10. The process of claim 1 wherein a copolymer of vinyl pyrrolidone and vinyl acetate is polymerized.

11. The process of claim 1 wherein a vinyl pyridine monomer is polymerized.

12. The process of claim 1 wherein said finely-divided inorganic solid is a metal oxide.

13. The process of claim 1 wherein said finely-divided inorganic solid is chosen from the group consisting of silica and alumina.

14. The process of claim 1 wherein said organometallic compound conforms to the formula
$$MM'_v X_n R_y$$

15. The process of claim 1 wherein said organometallic compound is an aluminum alkyl.

16. The process of claim 1 wherein said organometallic compound conforms to the empirical formula
$$R'_p H_m S O_{\frac{4-(m+p)}{2}}$$

17. The process of claim 1 wherein said organometallic compound is a silane.

18. The process of claim 1 wherein the polymerization reaction is accomplished in a liquid hydrocarbon medium.

References Cited by the Examiner

UNITED STATES PATENTS

| 3,166,541 | 1/1965 | Orzechowski | 260—93.7 |
| 3,166,542 | 1/1965 | Orzechowski | 260—93.7 |
| 3,166,543 | 1/1965 | Orzechowski | 260—93.7 |

FOREIGN PATENTS

| 823,024 | 11/1959 | Great Britain. |
| 592,111 | 7/1959 | Italy. |

JOSEPH L. SCHOFER, *Primary Examiner.*

J. F. McNALLY, F. L. DENSON, *Assistant Examiners.*